United States Patent
Haustein et al.

(10) Patent No.: US 8,559,534 B2
(45) Date of Patent: Oct. 15, 2013

(54) METHOD FOR DATA TRANSMISSION WITHIN A COMMUNICATION SYSTEM, SUBSCRIBER AND COMMUNICATION SYSTEM

(75) Inventors: Thomas Haustein, Potsdam (DE); Jijun Luo, München (DE); Egon Schulz, München (DE)

(73) Assignee: Nokia Siemens Networks Oy, Espoo (FI)

( * ) Notice: Subject to any disclaimer, the term of this patent is extended or adjusted under 35 U.S.C. 154(b) by 765 days.

(21) Appl. No.: 12/663,065

(22) PCT Filed: Jun. 10, 2008

(86) PCT No.: PCT/EP2008/057234
§ 371 (c)(1),
(2), (4) Date: Jan. 20, 2010

(87) PCT Pub. No.: WO2008/152038
PCT Pub. Date: Dec. 18, 2008

(65) Prior Publication Data
US 2010/0202542 A1    Aug. 12, 2010

(30) Foreign Application Priority Data
Jun. 15, 2007 (EP) .................................. 07011799

(51) Int. Cl.
*H04L 27/00* (2006.01)

(52) U.S. Cl.
USPC ............................................ 375/259; 370/208

(58) Field of Classification Search
USPC ................... 375/260, 267, 299; 370/203–211
See application file for complete search history.

(56) References Cited

U.S. PATENT DOCUMENTS

| | | | |
|---|---|---|---|
| 2003/0072395 A1 | 4/2003 | Jia et al. | 375/341 |
| 2004/0131007 A1 | 7/2004 | Smee et al. | 370/208 |
| 2004/0233872 A1 | 11/2004 | Lobinger et al. | 370/334 |
| 2005/0099972 A1* | 5/2005 | Motegi et al. | 370/328 |
| 2006/0293056 A1* | 12/2006 | Kim et al. | 455/442 |

FOREIGN PATENT DOCUMENTS

| | | |
|---|---|---|
| RU | 2233543 C2 | 7/2004 |
| WO | WO 01/71928 A2 | 9/2001 |
| WO | WO 01/71928 A3 | 9/2001 |
| WO | WO-2004045096 A2 | 5/2004 |
| WO | WO-2005078964 A1 | 8/2005 |
| WO | WO-2006015268 A2 | 2/2006 |

* cited by examiner

*Primary Examiner* — Curtis Odom
(74) *Attorney, Agent, or Firm* — Harrington & Smith

(57) ABSTRACT

The present invention is related to a method for data transmission via an interface between a communication pair of a transmitting subscriber and a receiving subscriber of a communication system, wherein a scrambled pilot signal is used both for channel measurement and for data transmission. The present invention relates further to a subscriber for data transmission and a communication system.

19 Claims, 4 Drawing Sheets

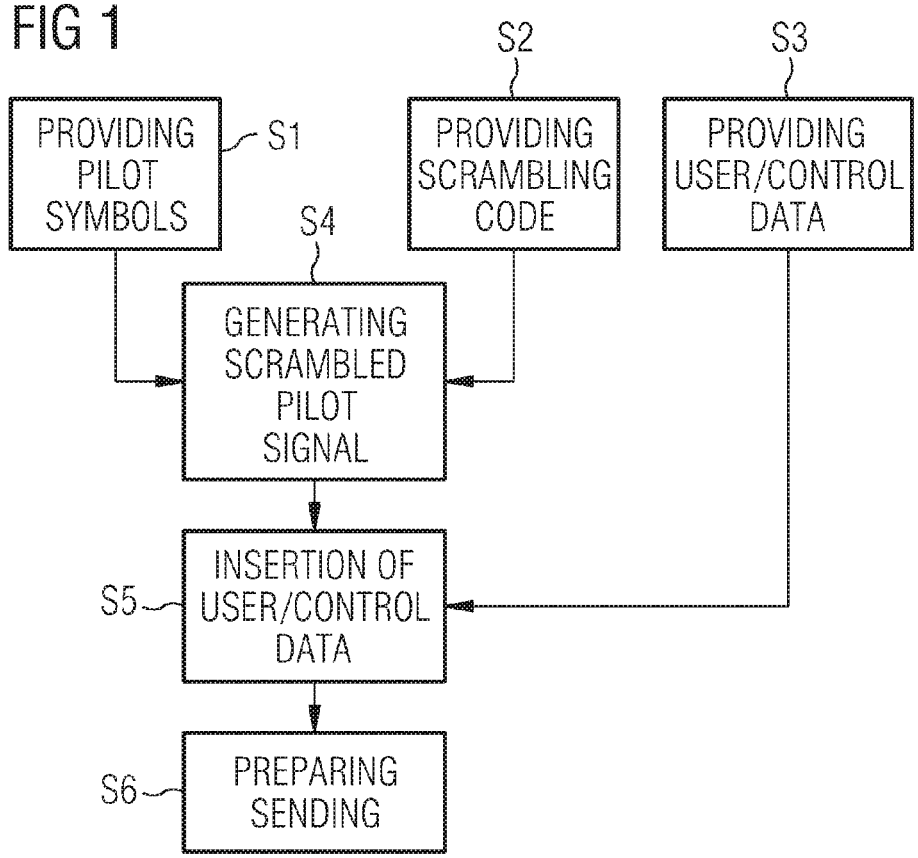
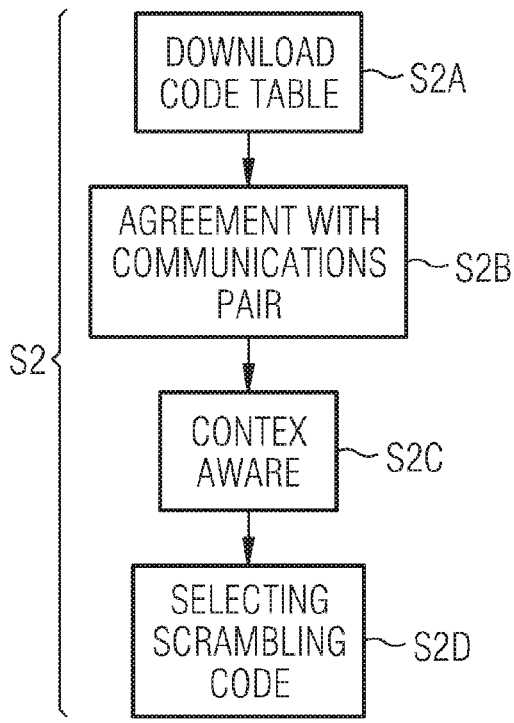

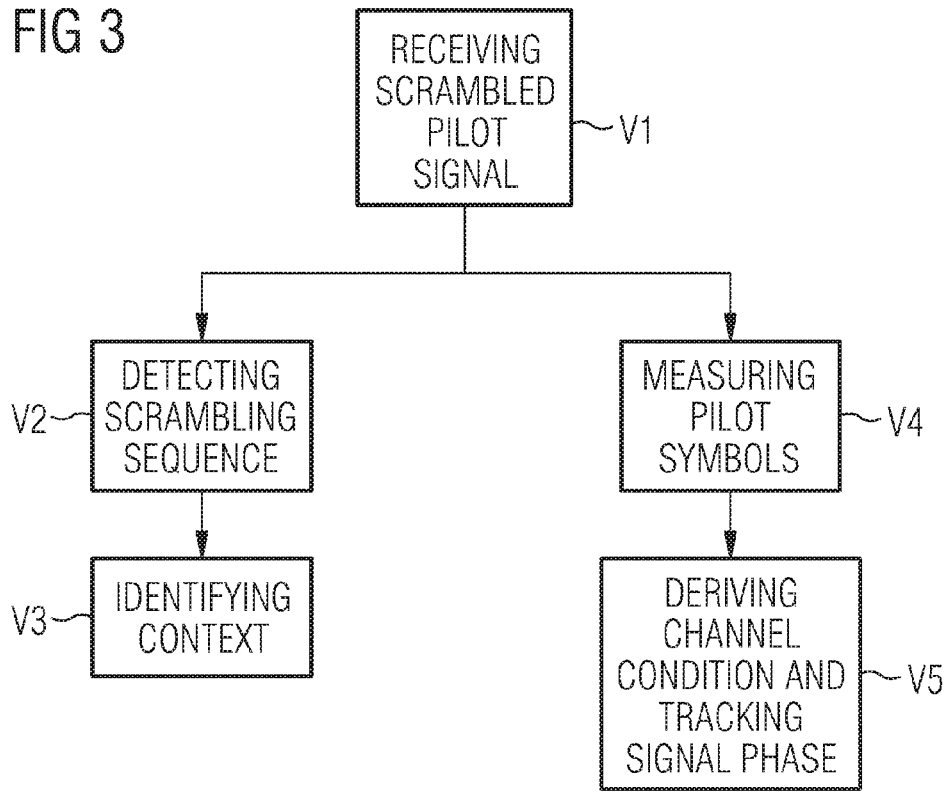
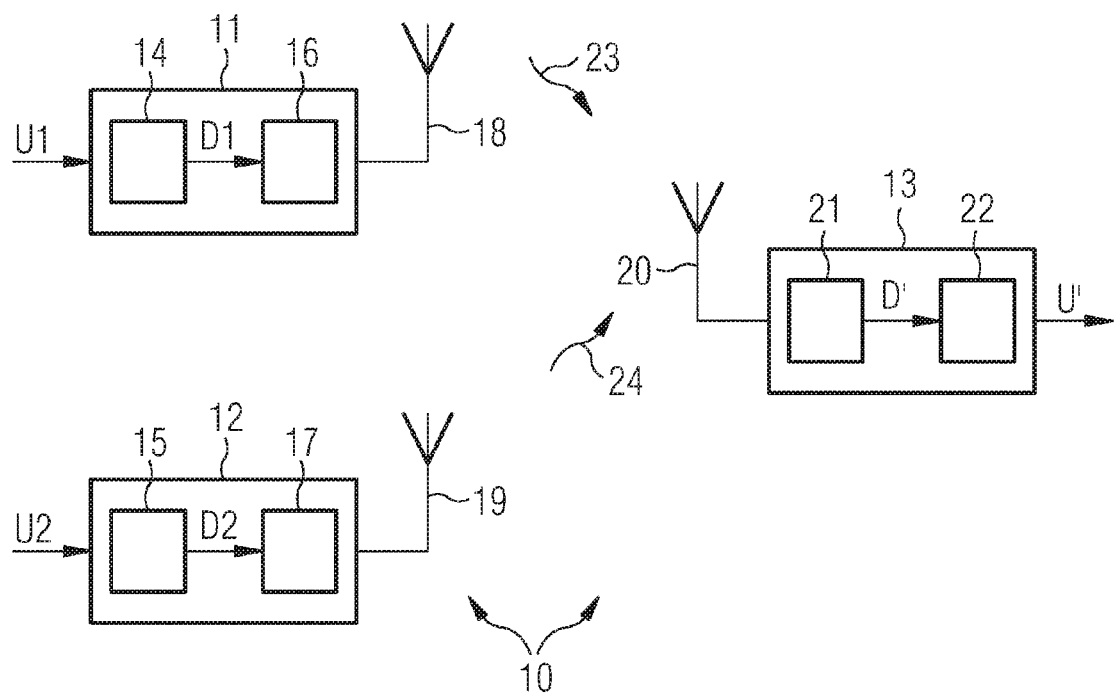

FIG 6

| Code Table Index | Indices | Scramble sequence | Codex (special meaning) 40 |
|---|---|---|---|
| 0 (first/default) | 0 (first/default) | +1,+1,+1,+1 | A default one for referencing |
| 1 | 1 | +1,+1,−1,−1 | MCS (Modulation and coding scheme) level 1 |
| | 2 | +1,−1,+1,−1 | MCS level 2 |
| | ... | | |
| 2 | 1 | +1,+1,−1,−1 | Frame structure mode 1 |
| | 2 | +1,−1,+1,−1 | Frame structure mode 2 |
| | ... | | |
| 3 | 1 | +1,+1,−1,−1 | Service level 1 |
| | 2 | +1,−1,+1,−1 | Service level 2 |
| | ... | | |

METHOD FOR DATA TRANSMISSION WITHIN A COMMUNICATION SYSTEM, SUBSCRIBER AND COMMUNICATION SYSTEM

FIELD OF THE INVENTION

The present invention is related to a method for data transmission within a communication system, a subscriber and a communication system.

TECHNICAL BACKGROUND OF THE INVENTION

Wireless communication systems—also known as radio communication systems—are well-known in the art. A wireless communication system refers to a communication system having a transmitting end and a receiving end in which signals are transmitted or communicated from the transmitting end to the receiving end via a signal path, wherein a portion of this signal path from the transmitting end to the receiving end includes signal transmission via a wireless interface. This wireless interface is also known as radio interface. Therefore, in wireless communication systems, data (for example voice data, image data or other digital data) is transmitted by means of electro-magnetic waves via this wireless interface.

Hereinafter, the present invention and the underlying problem is described with regard to such wireless communication systems, whereas, it should be noted, that the present invention is not restricted to a wireless communication system, but can also be used for wired communication, such as a broad band-communication.

Radio communication systems are facing constantly increasing challenges. On the one hand, there is the challenge of a limited spectrum which is used for carrying an increasing amount of data to be transmitted. On the other hand, the complicated environment of the radio transmission and individual situations of the data communication links take place inside one single data communication system. This data communication system typically comprises a fixed set of protocols which are—as a consequence of the above mentioned challenges—non-flexible.

In addition, there is a constant demand to introduce higher layer intelligences into the physical layer signal processing. In any wireless communication system, typically so-called pilot channels are provided for channel estimation, cell identification, phase reference, timing information to the different mobile stations. However, these pilot channels can only be used with a fixed pattern.

In a radio communication system such as a UMTS-system, several antennas are used at one base-station to utilise the spatial diversity. These antennas are weighted with different weighting factors for data transmission on dedicated channels to individual mobile stations. These weighting factors are generally complex numbers, consisting of an amount component and a phase component. A set of weighting factors used simultaneously for a dedicated channel is also known as a weighting vector.

With the Closed-Loop Transmit Diversity method, as it is called, a specific mobile station informs the corresponding base station e.g. by feed-back information in the uplink, how it should specify the weighting factors in order that optimum reception is achieved at the mobile station with the corresponding transmission power at the base station. To be able to supply this feed-back information, the mobile station must have estimates of the attenuation and phase shift on the single propagation paths from the various antennas of the base station to the mobile station. These estimates are in a UMTS communication system normally obtained by using a global pilot signal that is transmitted from the base station to all of the mobile stations within the corresponding cell of the base station. This global pilot system is an overlay of pilot-bit sequences of the individual antennas of the base station, with the pilot bit-sequence varying from antenna to antenna and being characteristic in each case of the transmitting antenna. Because these pilot bit-sequences are permanently specified and, therefore, are known to all mobile stations, a specific mobile station is therefore able to extract the pilot bit sequences from the downlink signal and separate these pilot bit sequences from each other, in order to estimate the channel properties, such as the attenuation, the phase shift for each individual antenna, the cell identification, timing information, etc.

This kind of channel estimation using a global pilot signal is well-known in the art and is described, for example, in US 2004/0233872 A1.

Channel estimation is also known in CDMA communication systems such as a WCDMA system. In a WCDMA communication system there exists a primary common pilot channel and a secondary common pilot channel, whereas, each of these pilot channels are coded by specific spreading codes.

A common challenge for wireless OFDM (OFDM=orthogonal frequency division multiplexing) communication systems is the centre frequency off-set estimation and the channel tracking. For MIMO (MIMO=multi-input multi-output) channel equalisation knowledge about the channel state information (CSI) is an important pre-condition. This channel state-information can be obtained, for example, by measuring the channel using known training symbols within the transmission frame.

In order to measure the phase evolution over time, often a second set of dedicated pilot channels is provided, in order to have a second reference point in time, which additionally allows phase-interpolation and prediction over the entire transmission frame, provided that the system parameter design is well-matched to the transmission scenario.

Besides the above mentioned different applications of using a global pilot signal or the corresponding pilot channels it is a constant demand, especially in wireless communication systems to extend the functionality of a data communication.

The present invention is, therefore, based on the object to better use the existing resources within a communication system especially within a wireless communication system.

SUMMARY OF THE INVENTION

In accordance with the present invention, a method having the features of claim 1 and/or a subscriber having the features of claim 13 and/or a communication system having the features of claim 17 is/are provided.

Accordingly, it is provided:

A method for data transmission via an interface between a communication pair of a transmitting subscriber and a receiving subscriber of a communication system, wherein a scrambled pilot signal is used both for channel measurement and for data transmission.

A subscriber for data transmission via an interface between a communication pair of a communication system capable to perform a method according to the invention.

A communication system, especially a radio communication system, comprising at least one transmitting subscriber and at least one receiving subscriber capable to communicate with each other via an interface, especially a radio interface, wherein at least one of the transmitting subscriber and/or receiving subscriber is a subscriber according to the invention.

The basic idea of the present invention is to use scrambled pilot signals, both for general measurement and for information transmission, within a communication system and especially within a wireless communication system, such as an OFDM(A) system. The idea on which the present invention is based on is to propose that the pilot symbols in a communication system are seen as a bit sequence, whereas this sequence is scrambled by e.g. previously defined different scrambling sequences. Each one of these previously defined different scrambling sequences has its special meaning in order that the counterpart of the data communication (i.e. the receiver unit) is then able to perform a signal measurement of this pilot signal and in addition to that also derive a special meaning of this scrambling sequence simultaneously.

The present invention is further based on the insight that this set of training symbols distributed over several frequency positions can be additionally exploited to provide additional information added to the channel state information (CSI), carrier frequency offset (CFO), phase tracking, etc.

In a communication system with MIMO characteristics, the communication system may use highly correlated MIMO channels to carry the scrambled messages (scrambled over multiple antennas) in order to detect the scrambling sequences.

Furthermore, when using multiple antennas this technique can also be exploited in a transmit antenna sense and the multiple receive antennas can be used to provide receive diversity when the reference symbols are made orthogonal in frequency.

The signal processing algorithm can be very fruitfully implemented in all wireless communication systems.

The main advantage of the signal processing algorithm according to the present invention and the corresponding subscribers is the fact, that a very effective information transmission scheme using signals can be employed. This can be used, for example, for identification of different subscribers (such as user equipments) or modulation and encoding schemes belonging to the time frequency resource block.

Further, by using the signal processing algorithm according to the present invention, which employs global pilot signals both for channel measurement and information transmission, this means also a very efficient usage of the typically limited resources of a communication system and especially of a wireless communication system.

Further, the present invention is also very advantageous since a fast signal transmission without evoking the higher level message exchanges is possible.

Advantages, embodiments and further developments of the present invention can be found in the further subclaims and in the following description, referring to the drawings.

In a preferred embodiment of the invention the data transmission is symbol-based, wherein for transmitting the method comprises the steps of: providing at least one pilot symbol, at least one scrambling code and user/control data; generating a scrambled pilot signal by combining the pilot symbol and the scrambling code; insertion of the user/control data in the scrambled pilot signal.

In a preferred embodiment of the invention a scrambling code is selected based on an agreement of a context of the communication pair.

In a preferred embodiment of the invention the step of providing the at least one scrambling code comprises the sub-step of: downloading a code table comprising a plurality of general contexts, wherein each context has its own meaning and comprises higher layer control messages or a table of services; making an agreement about special meanings of this context between the communication pair; choosing one particular context by the transmitting subscriber and context aware about the special meaning of this context; selecting the scrambling code corresponding to the chosen context by the transmitting subscriber.

In a preferred embodiment of the invention after the step of insertion of the user/control data in the scrambled pilot signal the scrambled pilot signal is prepared to be sent to the receiving subscriber.

In a preferred embodiment of the invention the step of preparing to be sent comprises the steps of serial-to-parallel conversion and Fourier transformation.

In a preferred embodiment of the invention the data transmission is symbol-based, wherein for reception the method comprises the steps of: receiving the scrambled pilot symbol; detecting the scrambling sequence within the received scrambled pilot symbol and identifying the context within the detected sequence; measuring by using the pilot symbol within the received scrambled pilot symbol and deriving channel conditions and tracking signal phase parameters.

In a preferred embodiment of the invention the scrambling sequence is based on an agreement of a context of the communication pair.

In a preferred embodiment of the invention the communication pair is able to perform a signal measurement and derive the special meaning of a context of the scrambled pilot symbol simultaneously.

In a preferred embodiment of the invention the pilot signals are previously defined.

In a preferred embodiment of the invention the communication system is a radio communication system and the interface is a wireless interface, wherein each one of the transmitting subscriber and the receiving subscriber has at least one antenna, to each of which a characteristic pilot bit sequence is assigned.

In a preferred embodiment of the invention the method is applicable for 3G LTE, WIMAX and/or 4G communication systems.

In a preferred embodiment of the invention the subscriber is a transmitting subscriber which comprises a first input terminal for providing a pilot symbol, a second input terminal for providing user data/control signal, a selection circuit for providing the scrambling code and combination means for combining the pilot symbol, the scrambling code and the user data/control signal to generate a scrambled pilot signal useable both for channel measurement and for data transmission.

In a preferred embodiment of the invention the transmitting subscriber comprises a serial-to-parallel converter for performing a serial-to-parallel conversion of the scrambled pilot signal, a Fourier transformation means for performing a Fourier transformation of the serial-to-parallel converted and scrambled pilot signal and a sending means for sending the Fourier converted scrambled pilot signal.

In a preferred embodiment of the invention the subscriber is a receiving subscriber.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which:

FIG. 1 shows a first embodiment of a signal processing algorithm according to the present invention to generate a scrambled pilot-signal in a transmitter unit;

FIG. 2 shows in more detail the step of providing the scrambling code of the embodiment in FIG. 1;

FIG. 3 shows a second embodiment of a signal processing algorithm according to the present invention to detect a scrambling code from a scrambled pilot signal within a receiver unit;

FIG. 4 shows a block diagram of a radio communication system according to the present invention;

FIG. 6 shows an exemplary table of services of higher level context.

In all figures of the drawings elements, features and signals which are the same or at least have the same functionality have been provided with the same reference symbols, unless explicitly stated otherwise.

DETAILED DESCRIPTION OF PREFERRED EMBODIMENTS OF THE PRESENT INVENTION

Figure 5:
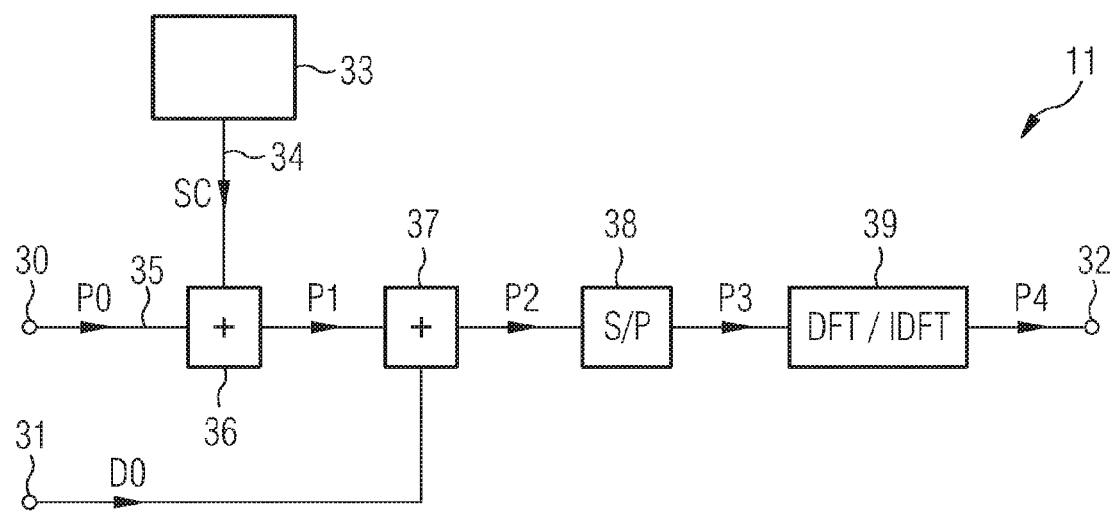
FIG. 5 shows a block diagram of a transmitter unit within a base station of the radio communication system as shown in FIG. 4 and using a signal processing algorithm according to FIGS. 1, 2.

In the following description of the present invention, a (wireless) radio communication system is described in which OFDM (orthogonal frequency division multiplexing) is used, however, without restricting the present invention to this type transmission.

FIG. 1 shows a first embodiment of a signal processing algorithm of the present invention to generate a scrambled pilot signal in a transmitter unit. It is assumed, that the transmitter unit is arranged within a subscriber unit of the communication system. This subscriber unit may be an access point such as a base station of the communication system. However, the subscriber unit may also be a user equipment such as a mobile terminal. It is further assumed, that the hereinafter described communication system is a wireless communication system.

In the signal processing algorithm shown in FIG. 1 at the beginning there are three data providing steps S1, S2, S3.

At step S1 so-called pilot symbols for a pilot channel are provided, whereas this pilot symbols may comprise suitable information about cell identification, phase references, timing information, etc.

At the step S2, according to desired specific messages of the transmitter unit, scrambling codes with special meanings represented by symbol sentences with fixed patterns are provided. These scrambled codes may be based on an agreement of a context which is made by the transmitter unit together with a counterpart of this data communication, whereas this counterpart may be a receiving unit. The generation of this scrambling codes is described in more detail with regard to FIG. 2.

At the step S3 user and/or control data for transmitting information are provided.

According to the present invention, at a subsequent step S4 a scrambled pilot symbol is generated by combining the individual pilot symbols provided in step S1 with the selected scrambling sequences which are provided in step S2. This scrambled pilot symbol may be distributed over several frequency positions to provide additional information added to channel state information (CSI), carrier frequency off-set (CFO) and phase tracking, for example, in an OFDM(A) system.

At a subsequent step S5 this scrambled pilot symbol generated in step S4 is further multiplexed with the user and/or control data provided by step S3.

This signal comprising the scrambled pilot symbol and the user/control data is then prepared for sending according to the protocol of the respective communication system in the subsequent step S6. At this step S6 known signal processing, such as serial/parallel processing, DFT, IDFT, etc. may be applied which will be later described in more detail with regard to the embodiment shown in FIG. 5.

FIG. 2 shows in more detail the step S2 of providing a scrambling code of the embodiment in FIG. 1. Here, in the first sub-step S2A general contexts of higher layer control messages (code table index), e.g. a table of services, may be downloaded by software or patch in the transmitter unit. This transmitter unit may make agreements about special meanings of this context with a corresponding counterpart of the data communication, such as the receiver unit of the data communication. This is shown in the sub-step S2B. The counterpart, i.e. the receiver unit of this communication pair is then able to perform signal measurements and derive the special meaning simultaneously. In the subsequent sub-step S2C the transmitter unit may choose a particular context according to its needs and requirements and make itself aware of the special meanings of this context. Accordingly, this transmitter unit selects the scrambling code corresponding to the respective context in the sub-step S2D.

It should be noted that the present invention is not limited to the ordering of the different steps as described above. For example, the steps S1, S2, S3 may also occur in different orders and/or concurrently as mentioned above in FIG. 1.

The signal processing algorithm, which was just described with regard to FIG. 1, may be applicable for all wireless communication systems, such as 3G LTE, WIMAX, 4G, etc.

Further, the signal processing algorithm according to the present invention is also applicable to wired communication systems. In general, the present invention is applicable to all channel-based communication systems using pilot signals, such as WIMAX, CDMA, OFDM(A), UMTS, etc.

Also, in a MIMO communication system (MIMO=multiple-input multiple-output) using multiple antennas this signal processing algorithm according to the present invention can also be exploited in a per transmit antenna sense. The different multiple receive antennas of this MIMO communication system can be used advantageously to provide receive diversity.

FIG. 3 shows a second embodiment of a signal processing algorithm according to the present invention to detect a scrambling code and deriving the information from a scrambled pilot signal within a receiver unit of a data communication.

Here, in the first step V1 a scrambled pilot signal, which may be generated via the method similar to that shown in FIG. 1 is received in the receiver unit of the communication system. This receiver unit is typically, but not necessarily a user equipment, such as a mobile terminal (cell-phone, modem, laptop, etc). The received scrambling pilot signal is then split into two different signal paths, whereas the first signal path comprises the steps V2, V3 and the second signal path comprises the steps V4, V5.

Within the first signal path the received scrambled pilot signal may be correlated with all possible scrambling codes among the commonly agreed contexts (step V2). This method of making an agreement between the transmitter unit and the receiver unit was already described above (step S2B in FIG. 2). With the highest correlation the receiver part is then able to detect a scrambling code used in the received scrambling pilot signal. At the step V3 the receiver unit is able to identify the corresponding special meanings of the context by means of the agreement and the detected scrambling code.

In the second signal path, by measuring all the pilot symbols of the received scrambling pilot signal in step V4 the channel condition and phase tracking can be derived without any performance degradation in the subsequent step V5. The measuring of the pilot symbols and the step of deriving the channel condition and tracking the signal phase is well-known in the art, so that, hereinafter these steps are not described in more detail.

FIG. 4 shows the structure of a radio communication system in which the present invention such as described with regard to FIGS. 1-3 may be used.

The radio communication system in FIG. 4 is denoted by reference symbol 10. This radio communication system 10 may be, by way of example, a universal mobile telecommunication system (UMTS) or a global system for mobile communication (GSM), but the invention shall not be restricted to such radio communication systems. In the example of FIG. 4, the radio communication system 10 includes two transmitters 11, 12 and one receiver 13. The transmitters 11, 12 and the receiver 13 can be assigned both to a base station and to a mobile station. Each one of the transmitters 11, 12 comprises a coder 14, 15, a modulator 16, 17 and one or more transmission antennas 18, 19. The receiver 13 comprises one or more reception antennas 20, a demodulator 21, and a decoding device 22. Consequently, two transmission channels 23, 24 are produced between the two transmitters 11, 12 and the receiver 13.

A respective coder 14, 15 which is, for example, a turbocoder, receives a digital input signal U1, U2 in the form of a sequence of data symbols (bits). These input signals U1, U2 carry, by way of example, a voice message to be transmitted. The respective coder 14, 15 adds a redundancy for error protection coding to the digital input signal U1, U2. An error protection coded data signal D1, D2 is present at the output of each one of the coders 14, 15 and, then, (in a manner that is not illustrated in FIG. 4) is interleaved and subdivided into blocks having a predetermined length. A respective modulator 16, 17 modulates the data signal—error protection coded in this way—onto a carrier signal that (likewise in a manner that is also not illustrated in FIG. 4) is spectrally shaped by a transmission filter and amplified by transmission amplifier before it is transmitted as a radio signal using the respective antennas 18, 19.

The reception antenna 20 receives the transmitted radio signal disturbed by ambient influences and interferences with radio signals in the transmission channels 23, 24 and feeds it to the input of the demodulator 21. In the simplest case, the demodulator 21 within the receiver includes a radio frequency stage that receives the radio signal received through the reception antenna 20 and converts it in a customary manner by down-conversion into an analogue reception signal D'. The analogue reception signal D' is then digitalised by an analogue/digital converter (AD-converter) with a sufficiently high sampling frequency and, if appropriate, bandwidth-limited by a digital filter connected downstream to the AD-converter. This demodulator 21 equalises the received radio signal taking account of the signal disturbances induced in the transmission channel 23, 24 to provide at an output terminal the received signal U'.

It is noted, that what was described just now with regard to the communication system in FIG. 4 is a typical arrangement of such a communication system. However, the present invention may be incorporated either in the transmitters 11, 12 and/or in the corresponding receivers. For example, the functionality of at least one of the transmitters 11, 12 is extended by a signal processing algorithm as shown with regard to FIGS. 1, 2. In this case, this signal processing algorithm according to the present invention may be incorporated in the coder part 14, 15 of the corresponding transmitters 11, 12. Further, the functionality of the receiver 13 can also be extended by incorporating the signal processing algorithm as shown with regard to FIG. 3 into, for example, the decoding device 22 of the receiver 13.

FIG. 5 shows an exemplary block diagram of a transmitter unit arranged within a base station of the radio communication system, as shown in FIG. 4. The transmitter is designed to generate a scrambled pilot signal according to the signal processing algorithm as shown with regard to FIGS. 1, 2.

The transmitter comprises two input terminals 30, 31 and an output terminal 32. At the first input terminal 30 a pilot signal P0 is provided. Further, the transmitter comprises a selection circuit 33. The selection circuit 33 provides selected scrambling codes SC. The selection circuit 33 and the first input terminal 30 are both connected via corresponding signal lines 34, 35 to a first multiplexer unit 36. In the multiplexer part 36 the pilot symbol P0 and the scrambling code SC are combined to each other (e.g. by multiplexing) to provide at an output side of the multiplexer unit 36 a scrambled pilot signal P1. This scrambled pilot signal P1 is combined in a second multiplexer unit 37 with user/control data D0 which are provided at the second input terminal 31. At an output side of the second multiplexer unit 37 the scrambled pilot signal which comprises the user/control data is provided. This pilot signal P2 is provided to a downstream arranged serial/parallel converter 38 which performs a serial/parallel conversion of this scrambled pilot signal P2. Afterwards, the pilot signal P3 generated by the serial-to-parallel converter 38 is then provided to a transformation device 39. This transformation device 39 may perform a discrete Fourier transformation and/or an inverse discrete Fourier transformation. The transformation device 39 is connected to the output terminal 32 to forward and provides the transformed pilot signal D4 to this output terminal 32.

The first multiplexer unit 36 may carry out a scrambling between the pilot signals P0 and the scrambling code SC to provide at its output a scrambled pilot signal P1. This scrambled pilot signal P1 may be then transferred to the second multiplexer unit 37. This operation is comparable to the step S4 in FIG. 1.

At the second multiplexer unit 37 the scrambled pilot signal P1 may be multiplexed with the user/control data D0 inserted from the second input terminal 31. This step of insertion of the user/control data is comparable with the step S5 in FIG. 1.

The second multiplexer unit 37 provides then an output signal P3 transferred to the downstream arranged serial/parallel converter 38 via a signal line. This serial/parallel converter 38 may provide a signal applied for transformation circuit 39. By using this transformation circuit 19 a signal P4 for sending is provided to the output terminal 32 of the transmitter unit 11.

With regard to an OFDM(A) system the modulation part is represented herein by the serial/parallel converter 16 and the transformation circuit 39. This transformation circuit 39 may perform an IDFT (inversed discrete Fourier transformation) and/or a DFT (discrete Fourier transformation) circuit.

The block diagram shown with regard to FIG. 5 can also be applied to other communication systems, for example by modifying the serial/parallel converter 38 and/or the transformation device 39.

Tables of services or more generally contexts of layer control messages, so-called code-table indices, such as requests can be communicated to the transmitter unit 11, 12 by the selection circuit 33, for example, in a form as through, for example, software/patch download. An example of the content of such a table of services is shown with regard to the table in FIG. 6.

The code table 40 comprises 4 columns, whereas in the first column 41 information about the code table index is provided. The second column 42 describes the different indices. The third column 43 comprises the different scrambled sequence bits and in the fourth column 44 the different contexts are given.

In the table 40 shown in FIG. 6 altogether 4 different services are deposited:

The first service 45 comprises only one line. This first service describes a default configuration with a scrambling sequence +1, +1, +1, +1.

The second service 46 describes a modulation and coding scheme. In the table 40 there are given a multiplicity of modulation and coding schemes (MCS) which define different levels. For example, the scrambling sequence for the level 1 (MCS) has the scrambling content +1, +1, −1, −1, whereas, the scrambling sequence of the level 2 (MCS) comprises the content +1, −1, +1, −1. It is self-understood, that besides these two MCS levels there might be also only one MCS level or more than two MCS levels which are stored, for example, in the selection circuit 33. The different MCS levels are denoted by reference symbol 46 in the table 40.

Another service, which is referenced by reference symbol 47, refers to the frame structure of the data communication. The frame structure indicates whether a data communication is carried out for the uplink, for the downlink or as well for the uplink and the downlink. In the table 40 in FIG. 6 two different frame structures are given coded by two different scrambling sequences +1, +1, −1, −1 and +1, −1, +1, −1.

Further, a fourth service is denoted by reference symbol 48 in FIG. 6. This service refers to the service level, for example whether a data communication is carried out in the background or in the foreground. For example, the service level "1" refers to a background communication, whereas the service level "2" refers to a foreground communication. The service level "2" is, for example, more important than the service level "1". For example, if within the service level "2" voice data or other important data are communicated, whereas, for example, within the service level "1" only communication status information. This status information is less urgent and can be also transmitted at a later point of time.

In general, the usage of the scrambled pilot signal can be flexible directly after the handshake of an agreement between the transmitter and the receiver of the code table index, as shown in FIG. 6.

For example, in a communication system with MIMO characteristics, the at least two antennas of the transmitter can use the same or also a different scrambling code. If they are using different scrambling codes, for example, the first channel can be used for phase tracking, whereas the second channel can be operated in a channel mode.

While embodiments and applications of this invention have been shown and described above, it should be apparent to those skilled in the art, that many more modifications (than mentioned above) are possible without departing from the inventive concept described herein. The invention, therefore, is not restricted except in the spirit of the appending claims.

It is therefore intended that the foregoing detailed description is to be regarded as illustrative rather than limiting and that it is understood that it is the following claims including all equivalents described in these claims that are intended to define the spirit and the scope of this invention. Nor is anything in the foregoing description intended to disavow the scope of the invention as claimed or any equivalents thereof.

It is also noted that the above mentioned embodiments and examples should be understood to be only exemplary. That means that additional system arrangements and functional units may be implemented within the base station (or access point) and/or within one or more of the user equipments (or mobile terminals).

Further, the present invention is explicitly not limited to a wireless communication but can also be used in a hardwired communication network, which is, for example, also symbol based and/or receiver oriented.

A user equipment is, for example a mobile terminal, especially, a mobile telephone or a mobile or fixed device for transmission of image and/or sound data, for fax services, for short message services (SMS), for multimedia messaging service (MMS) and/or e-mail transmission and/or for internet access.

A base station is a network-side station which is designed to receive the user data and/or signalling data from at least one user equipment and/or is designed to send user data and/or signalling data to the corresponding user equipment. The base station is typically coupled via network-side devices to a core network, via which connections are made to other radio communication systems in other networks.

The description describes a base station as a sending station and a user equipment as a receiving station, however, without wishing to express that the invention is to be restricted to this arrangement of a communication system. An user equipment may also be used as a sending station and a base station may also be used as a receiving station, for example.

Data transmission can be both bidirectional between the base station and the user equipment or only unidirectional between one of the base station and the user equipment and the corresponding other one.

Further, the present invention is explicitly not limited to a wireless communication but can also be used in a hardwired communication network, which is, for example, also symbol based.

Radio communication systems are especially any mobile radio system, for example in accordance with the commonly known GSM standard or the UMTS standard. Future mobile radio communication systems, for example of the so-called fourth generation, as well as ad hoc networks, are also to be understood as radio communication systems. Radio communication systems are, for example, also WLANs (Wireless Local Area Networks) as well as so-called Bluetooth networks and broadband networks with wireless access.

LIST OF USED REFERENCE SYMBOLS

U1, U2 input signal
U' output signal
D0 user/control data, information signal
D1, D2, D' data signals
P1-P4 pilot signals
SC scrambling code
S1-S6 steps of a signal processing algorithm according to a first embodiment
S2A-S2D sub-steps of step S2
V1-V5 steps of the signal process algorithm according to a second embodiment
10 radio, wireless) communication system
11, 12 transmitters 13 receiver
14, 15 coders
16, 17 modulators
18, 19 transmission antennas
20 reception antenna
21 demodulator
22 decoding device
23, 24 transmission channels
30, 31 input terminals
32 output terminal
33 selection circuit
34, 35 signal lines
36, 37 multiplexer unit, combining means
38 serial-to-parallel converter
39 transformation device
40 code table
41-44 columns of the code table
45-48 different services/level contexts

The invention claimed is:

1. A method for data transmission via an interface between a communication pair of a transmitting subscriber and a receiving subscriber of a communication system, wherein a scrambled pilot signal is used both for channel measurement and for data transmission, wherein
the data transmission is symbol-based and wherein for transmitting the data the method comprises the steps of:
providing at least one pilot symbol, at least one scrambling code and user/control data;
generating a scrambled pilot signal by combining the pilot symbol and the scrambling code;
inserting the user/control data in the scrambled pilot signal,
wherein the scrambling code is selected based on an agreement of a context of the communication pair, and
where the context corresponds to a given meaning of a specific scrambled sequence of bits used in the at least one scrambling code and identifies a service of the communication system.

2. The method according to claim 1,
wherein the step of providing the at least one scrambling code comprises the sub-step of:
downloading a code table comprising a plurality of general contexts, wherein each context has its own meaning and comprises higher layer control messages and/or a table of services;
making an agreement about special meanings of this context between the communication pair;
choosing one particular context by the transmitting subscriber and context aware about the special meaning of this context;
selecting the scrambling code corresponding to the chosen context by the transmitting subscriber.

3. The method according to claim 1,
wherein after the step of insertion of user/control data in the scrambled pilot signal the scrambled pilot signal is prepared to be sent to the receiving subscriber.

4. The method according to claim 3,
wherein the step of preparing to be sent comprises a step of at least one of serial-to-parallel conversion and Fourier transformation.

5. The method according to claim 1,
wherein for receiving data the method comprises the steps of:
receiving the scrambled pilot symbol;
detecting the scrambling sequence within the received scrambled pilot symbol and identifying the context within the detected sequence;
measuring by using the pilot symbol within the received scrambled pilot symbol and deriving channel conditions and tracking signal phase parameters.

6. The method according to claim 5, wherein the scrambling sequence of the scrambling Code is based on an agreement of a context of the communication pair.

7. The method according to claim 5,
wherein the communication pair is able to perform a signal measurement and to derive the special meaning of a context of the scrambled pilot symbol simultaneously.

8. The method according to claim 1,
wherein the pilot signals are previously defined.

9. The method according to claim 1,
wherein the communication system is a radio communication system and the interface is a wireless interface, wherein each one of the transmitting subscriber and the receiving subscriber has at least one antenna, to each of which a characteristic pilot bit sequence is assigned.

10. The method according to claim 1,
wherein the method is applicable for at least one of 3G LTE, WIMAX and 4G communication systems.

11. A subscriber for data transmission via an interface between a communication pair of a communication system capable to perform a method according to claim 1.

12. The subscriber according to claim 11,
wherein the subscriber is a transmitting subscriber which comprises a first input terminal for providing a pilot symbol, a second input terminal for providing a user data/control signal, a selection circuit for providing the scrambling code and combination means for combining the pilot symbol, the scrambling code and the user data/control signal to generate a scrambled pilot signal useable both for channel measurement and for data transmission.

13. The subscriber according to claim 12,
wherein the transmitting subscriber comprises a serial-to-parallel converter for performing a serial-to-parallel conversion of the scrambled pilot signal, a Fourier transformation means for performing a Fourier transformation of the serial-to-parallel converted and scrambled pilot signal and a sending means for sending the Fourier converted scrambled pilot signal.

14. The subscriber according to claim 11,
wherein the subscriber is a receiving subscriber.

15. A communication system, specifically a radio communication system, comprising at least one transmitting subscriber and at least one receiving subscriber capable to communicate with each other via an interface, specifically a radio interface, wherein at least one of the transmitting subscriber and receiving subscriber is a subscriber according to claim 11.

16. The method according to claim 1, where the service is a modulation coding scheme of the communication system.

17. The method according to claim 1, where the service is a frame structure of the communication system.

18. The method according to claim 1, where the service is a service level of the communication system.

19. The method according to claim 1, where the context is indicative of layer control messages of the communication system.

* * * * *